United States Patent Office 3,284,999
Patented Nov. 15, 1966

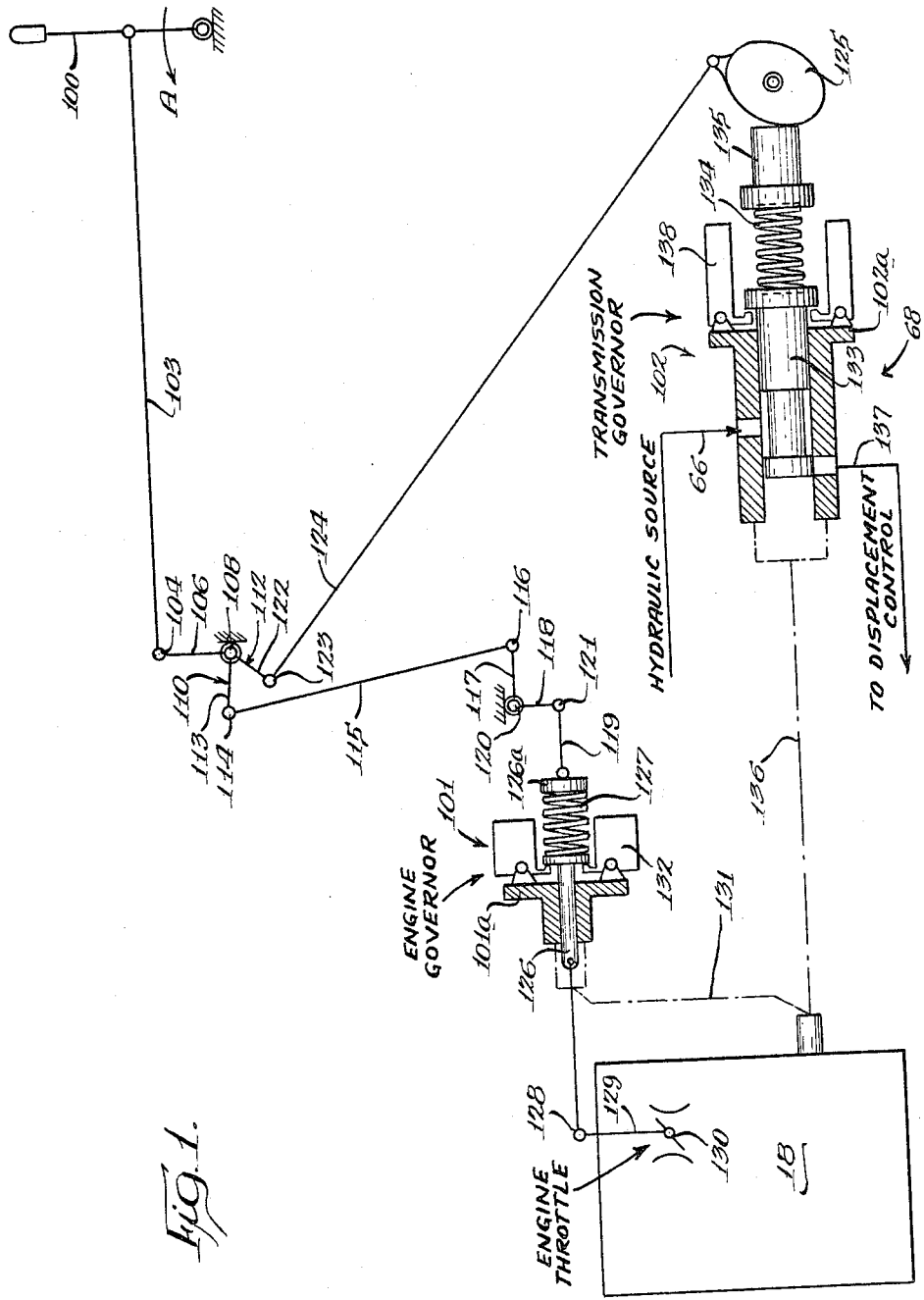

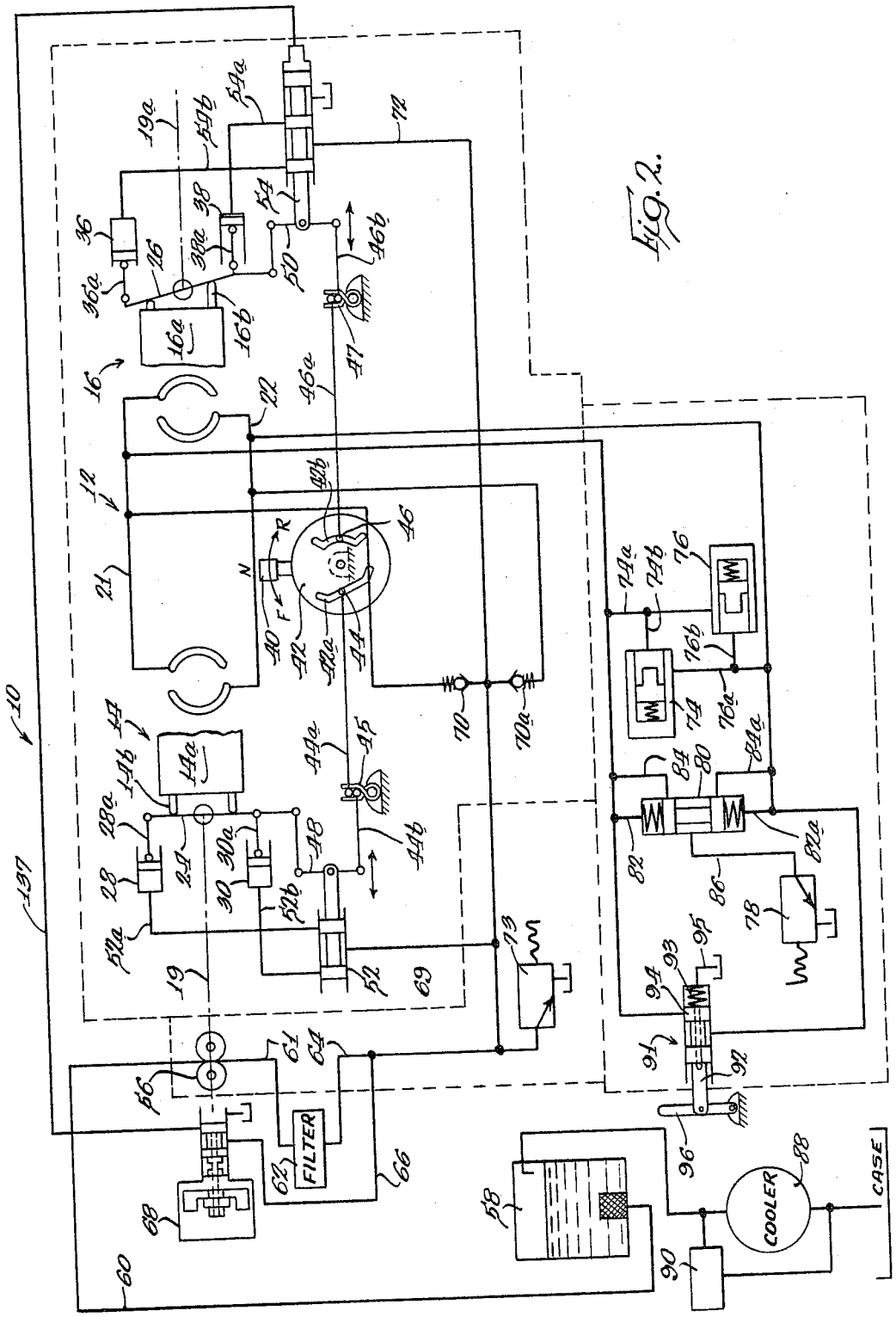

3,284,999
HYDROSTATIC TRANSMISSION
Robert J. Lease, La Salle, Ill., assignor to Sundstrand Corporation, a corporation of Illinois
Continuation of application Ser. No. 437,652, Mar. 8, 1965. This application Feb. 1, 1966, Ser. No. 533,742
3 Claims. (Cl. 60—19)

This invention is a continuation of my application Serial No. 437,652, filed March 8, 1965, now abandoned (which is a continuation-in-part of my application Serial No. 356,610, now abandoned) and relates to hydrostatic transmissions and more particularly to an improved control means therefore.

Hydrostatic transmissions have found a great deal of use in tractor-type vehicles for propelling the vehicle. If the vehicle is encountering difficult terrain or heavy work load, the engine may begin to lose speed and approach stalling. It may be desirable to maintain a constant engine speed to maintain a constant horsepower output at the transmission and therefore means may be provided responsive to the engine speed for accelerating the same in response to decrease thereof. However, if the engine is still incapable of maintaining speed under the load conditions and continues to drop in speed further and more closely approaches stalling, then it is desirable to provide a second regulating or governor means which will vary the power output of the transmission in response to a given drop of engine speed below that for actuating the engine governor.

It is therefore a primary object of this invention to provide a new and improved control means for a hydrostatic transmission.

It is a primary object of this invention to provide a new and improved control means for a hydrostatic transmission which possesses the advantages mentioned above.

It is another object of this invention to provide a new and improved control means for a hydrostatic transmission having means responsive to engine speed for bringing an engine up to speed in response to a drop thereof while maintaining the power output of the transmission at a constant level.

It is still another object of this invention to provide a new and improved control means for a hydrostatic transmission having means responsive to the engine speed for bringing an engine up to speed in response to a drop in the output thereof while maintaining the transmission output at a constant power and being further provided with a means for reducing the power output of the transmission in response to a further drop in engine speed below a predetermined level.

It is yet another object of this invention to provide a new and improved control means for a hydrostatic transmission having an engine governor means responsive to a drop in engine speed to bring the engine up to speed while maintaining the transmission at a constant power output, and having transmission governor means for varying the torque of the transmission in response to a further drop in engine speed and being further provided with means for selectively establishing an initial setting for the activation of both the engine governor means and transmission governor means.

Other objects, features and advantages of the present invention will be apparent from the following description of the preferred embodiment illustrated in the accompanying drawings, in which:

FIGURE 1 is a diagrammatic illustration of the control means of this invention; and FIGURE 2 is a diagrammatic illustration of a hydrostatic transmission embodying the control means of this invention.

Referring now to the drawings, in FIGURE 2, there is shown a hydrostatic transmission 10 having a closed hydraulic circuit 12 with an engine driven pump 14 and a fluid driven motor 16. The pump is driven by an engine diagrammatically illustrated at 18 (FIGURE 1) through suitable means diagrammatically illustrated at 19. In turn, the output of the transmission is applied to an output shaft schematically illustrated at 19a for appropriately propelling the vehicle. The closed circuit 12 consists of conduits 21 and 22 which carry the pumped fluid from the pump to the motor and return the same to the pump, with the pump outlet connected to the motor inlet and the motor inlet connected to the pump outlet in a well known manner.

In the embodiment shown, both the pump and the motor are of an axial piston type having rotatable cylinder blocks 14a and 16a, respectively, each with a plurality of cylinders in annular array and reciprocal pistons 14b and 16b therein. The pump has a reversible variable pump swash plate diagrammatically illustrated at 24 which is engaged by the pistons 14b and the motor has a variable displacement motor swash plate diagrammatically illustrated at 26 which is engaged by the pistons 16b. The combination of the fully reversible variable displacement pump swash plate and variable displacement motor swash plate gives the transmission extreme flexibility so that it is capable of operating the vehicle in either direction over a wide range of torque and speed thereby permitting an infinite number of torque-speed output combinations.

Operatively associated with the pump swash plate are the pump control cylinders 28 and 30 which are well known piston and cylinder devices and are connected to the swash plate by the rods 28a and 30a for positioning the swash plate in response to actuation by the cylinder. When the transmission is at neutral, the control cylinders maintain the pump swash plate in an upright position through the influence of centering springs in each cylinder (not shown).

Similarly, the motor swash plate has operatively associated therewith motor control cylinders 36 and 38 which are also well known piston and cylinder devices connected to the swash plate by rods 36a and 38a.

A control handle 40 is provided for selective actuation of the transmission. In particular, the control handle 40 is mounted on a cam 42 having pump cam slot 42a and motor cam slot 42b therein. A pump control pin 44 and motor control pin 46 are positioned in the slots 42a and 42b, respectively, and secured to the end of pump control link 44a and motor control link 46a, respectively, so that when the cam 42 is turned, the links will be appropriately moved. Links 44a and 46a are connected through override springs 45 and 47 to move links 44b and 46b, respectively. By means of cross links 48 and 50 centrally pivotally mounted to the stems of a pump control valve 52 and motor control valve 54, respectively, the pump control link 44b and motor control link 46b are operatively associated with the pump control valve 52 and motor control valve 54, respectively.

The override springs 45 and 47 provide a normally rigid resilient connection between the links 44a, 46a and the control valves 52 and 54, respectively. Each of the springs is a pivotally mounted torsion spring which permits relative movement between the associated links when one of the links is restrained from movement. An override spring of this type is described in detail in the Hann application, Serial No. 362,257, filed April 24, 1964, now Patent No. 3,212,263, issued October 19, 1965, assigned to the same assignee of the present invention. Override springs 45 and 47 provide several functions in the present system. Firstly, they prevent damage to the control valves 52 and 54 when handle 40 is rotated beyond the position required to move the valves to their limit positions. Secondly, override spring 47 permits links 46a and 46b to yield when an override signal is supplied to valve 54 in a manner more fully described below. Movement of the aforementioned control links 44b and 46b in a given direction in response to movement of control handle 40 will so position the valves 52 and 54 to cause fluid to be supplied through conduit 52a or 52b and 54a or 54b, respectively, to one of the pump control cylinders and motor control cylinders for appropriate positioning of the pump and motor swash plates. It is to be noted that both the linkages 48 and 50 are such that, as the swash plates are moved in response to a fluid signal supplied by the valve 52, the linkages will be moved to reposition the valve stem and thereby provide a feedback signal which will tend to terminate the supply of control fluid to the control cylinders when the control cylinders have moved the swash plates to the desired position.

It should be noted that the cam slots 42a and 42b are formed to stage the pump and motor so that in bringing the transmission up to speed from neutral the pump is first moved from neutral into stroke while the motor is held at maximum displacement after which the pump is held at maximum displacement while the displacement of the motor is reduced.

The transmission is provided with a positive displacement gear type replenishing and cooling pump 56 which is also driven by the engine 18. The replenishing and cooling pump is in communication with a reservoir 58 through a supply conduit 60 for supplying replenishing and cooling fluid to the system as well as control fluid by means of the charge conduit 61. From the replenishing pump 56, fluid is passed through a filter 62 and exits therefrom through conduit 64 where some of the fluid is directed by conduit 66 to a speed sensing means 68. The remaining fluid continues to flow through the conduit 64 and is fed by means of a conduit 69 into the valve 52. Fluid is supplied through conduit 72 to the motor control valve 54.

A pair of spring-biased check valves 70 and 70a are provided for discharging the fluid from line 22 to the low pressure side of the transmission through one check valve while pressure in the high pressure conduit of 21 and 22 will maintain the other valve closed. A spring-biased make-up relief valve 73 is in communication with the conduit 64 and serves to remove excess fluid pumped by the control pump and conduct the same to drain in the reservoir when the transmission is in neutral.

The transmission is further provided with a pair of high pressure relief valves 74 and 76 which are in communication with the conduits 20 and 22 by means of the conduits 74a and 74b and 76a and 76b. The function of the high pressure relief valves is to prevent abnormally high pressure in circuit 12 by relieving the two main hydraulic lines 21 and 22 of surge pressure which may occur during rapid acceleration of abrupt braking. Oil from the high pressure conduit will pass by means of the conduits 74b or 76b to appropriately move the valve stems of the valves 74 or 76, respectively, and then feed out to the other side of the system by means of either the conduits 76a or 74a, respectively.

For establishing a circuit between the main line 20 or 22 that is at low pressure and a low pressure relief valve 78, a shuttle valve 80 is provided. The shuttle valve 80 is in communication with the conduits 20 and 22 by means of the conduits 82, 84 and 82a, 84a, respectively, and provides a means for removing heated oil which has been displaced by cooling oil supplied by replenishing pump 56. Fluid from the main conduit that is at high pressure acts through either conduit 82 or 82a to appropriately position shuttle valve 80 so that fluid from the conduit 84a or 84, respectively, may be placed in communication with the relief valve 78 by means of the conduit 86. From the relief valve 78, the fluid passes to drain.

A heat exchanger 88 is provided in communication with the drain conduits and in the path of travel of the fluid as it is returned from drain to the reservoir 58. A bypass means 90 is provided for bypassing the cooler if an excessive pressure drop occurs thereacross.

A bypass valve 91 is provided between conduits 21 and 22. This valve has a stem 92 associated with the vehicle brake pedal shown at 96, so that it is actuated thereby. The valve is normally centered by a spring 93 so that fluid flow between the line is blocked by the land 94. A drain 95 is provided for conducting leakage fluid to drain for return to reservoir 58. As shown in the diagram, the valve is in its neutral or normal position and does not permit flow between the two main lines 21 and 22 during normal operation. During braking conditions, pressure can rapidly increase in the high pressure one of lines 21 and 22 which is supplying pumped fluid to the motor and this buildup can become increasingly disproportionate to the pressure in the other or low pressure one of lines 21 and 22. As the brake pedal is applied, the valve stem 92 is moved to the right (as shown in FIGURE 2) establishing communication between the lines 21 and 22 and permitting fluid to pass therebetween intermediate the pump and the motor so that the fluid pressure between the lines may be maintained at relatively safe levels. This valve is provided in addition to the previously described bypass valves as a means directly responsive to braking conditions for maintaining similar pressure values between the two conduits.

In FIGURE 1, there is shown a diagrammatic illustration of the governor means of this invention. An engine throttle control and governor setting handle 100 is provided for controlling the speed of the engine 18 as well as establishing a desired governor setting for an engine governor 101 and transmission governor 102. Transmission governor 102 includes speed sensing means 68. The handle is provided with linkage 103 which is pivotally connected to arm 106 at 104. Link 106 is connected to a fixed pivot support 108. At pivot 108, the handle movement is subdivided into two outputs by the two linkage means, such as 110, which is associated with the engine governor 101 and 112, which is associated with the transmission governor 102.

Linkage means 110 includes an arm 113 on lever 106 pivotally connected at 114 to link 115 which extends from pivot 114 to a pivotal connection 116 with lever 117 pivotally mounted at 120. Arm 118 on lever 117 is pivotally connected at 121 to one end of link 119. The other end of link 119 is pivotally connected to a piston 126a. Linkage means 112 includes an arm 122 on lever 106 pivotally connected at 123 to a link 124 which extends to a pivotal connection with a transmission governor cam 125.

The engine governor 101 includes a biased stem 126 and resilient means, such as compression spring 127, interposed intermediate the stem and the piston 126a. The plunger 126 is associated through pivot 128 and arm 129 with the engine throttle 130 so that movement of the handle 100 may be translated through the associated linkages and pivots to control the engine throttle 130 for setting a desired engine speed. The engine 18 rotatably drives a flyweight carrier 101a in the engine governor 101 through suitable means schematically represented by 131. The rotary carrier in the engine governor is provided with pivoted flyweights 132 which are adapted to move out in well known flyweight fashion, and urge plunger 126 against the spring 127 in response to engine speed.

The transmission governor 102 is a flyweight activated valve having a stem 133 slidably mounted therein. The stem 133 abuts a compression spring 134 which, in turn, abuts a piston 135, which engages the cam 125. The engine 18 drives the transmission governor through suitable means schematically represented at 136 to rotate a carrier 102a for pivoted flyweights 138 and cause them to fan out in a well known manner and move the valve stem 133 against the urging of spring 134 to push in opposition to piston 135.

As previously mentioned, control fluid is supplied to the speed sensor portion 68 of transmission governor 102 by means of conduit 66. A conduit 137 is in communication with the transmission governor and motor swash plate displacement valve 54 so that when the valve stem 133 is moved to permit fluid to pass around the reduced portion thereof and out the conduit 137, it will be supplied to the motor displacement control valve 54 to move the latter to supply fluid to cylinder 36 to increase the angle of motor swash plate 26, increase the displacement of the motor and thereby increase the torque and reduce the speed thereof. As the valve 54 moves in this manner override spring 47 yields permitting link 46b to move with respect to link 46a which is then held by the cam 42.

In operation, as the handle 100 is moved to the left, as shown by the arrow A in FIGURE 1, the associated pivots and linkages will set the engine throttle spring 127 for the desired engine speed. This act of positioning the engine throttle also will urge the engine governor piston 126a to compress the engine governor spring 127 and set the force required by the flyweights to pivot out in flyweight fashion when the engine drives the engine governor. Similarly, the cam 125 will be rotated to force the transmission governor piston 135 against the spring 134 to set the force required for the transmission governor flyweights 137 to fan out as the engine rotates the engine governor. The higher the engine speed set on the engine throttle, the greater the force required to overcome the pressure of the governor springs 127 and 134. However, the springs 127 and 134 are designed so that as the engine speed increases the flyweights move out in opposition to the springs. Once the engine approximates the speed established by the spring 127, any further movement of flyweights 132 tends to reduce the throttle setting and hold the engine speed at the desired value. If the vehicle begins to lose engine speed due, for example, to heavy load conditions encountered thereby, the flyweights 132 will, under the influence of the spring 127, be pushed back. This movement of the spring 127 will also move the plunger 126 in a direction which causes an increased setting to be placed on the engine throttle and thereby overcome the decrease in speed sensed by the engine governor.

The transmission governor spring and engine governor spring are so related that less force is required at any given speed setting for the flyweights to overcome the transmission governor spring than is required of the flyweights of the engine governor to overcome the spring therefor. Thus, the transmission governor will sense a reduction in engine speed at a lower speed than that sensed by the engine governor. Therefore, only after the engine governor is incapable of bringing the engine back up to a predetermined speed, will the transmission governor sense an additional drop in engine speed and respond thereto. The valve stem 133 will move to the left from the position shown in FIGURE 1 establishing communication between the control fluid conduit 66 and the displacement control conduit 137. This will supply fluid to motor displacement control valve 54 and urge the valve stem thereof to the left as shown in FIGURE 2. This will have the effect of appropriately supplying control fluid to the motor control cylinder 36 so as to reposition the swash plate 26 toward a position of maximum displacement to increase transmission torque and reduce the speed thereof and thereby prevent a further drop in engine speed and eliminate the possibility of stalling the engine.

In operation, it will be understood that with the engine operating at a predetermined speed, any increased load on the vehicle results in a pressure rise in the system and an increased horsepower load on the engine. Normally, the engine governor tries to maintain the engine speed determined by the spring setting in the engine governor. If the engine governor cannot maintain engine speed and the latter keeps dropping, the transmission governor senses the drop and then attempts to reduce the load on the engine to prevent its stalling. That is, the transmission governor increases the torque at the motor and reduces the speed, reducing the system pressure and maintaining a constant horsepower load on the engine. Thus, the maximum horsepower is obtained from the engine at all times, rather than allowing small overloads to stall the engine.

I claim:

1. In a drive system, a pump, means for varying the displacement of the pump, a motor, means for varying the displacement of the motor, conduit means connecting the pump outlet with the motor inlet and the motor outlet with the pump inlet so that the pump delivers fluid under pressure to drive the motor and the motor returns fluid to the pump, manually operable means connected for controlling the pump and motor displacement varying means to increase the displacement of the pump while holding the motor near maximum displacement and then reducing the displacement of the motor while holding the pump near maximum displacement thereby to bring the transmission up to speed, an engine for driving the pump including an engine throttle for controlling engine speed, a rotary engine governor responsive to engine speed and controlling the engine throttle to maintain engine speed at a predetermined value including means for adjusting the setting of the governor to vary said predetermined value, a rotary transmission governor responsive to engine speed and operable to increase the displacement of the motor upon a drop in engine speed to a value below the set predetermined value including means for adjusting the setting of the governor to vary said lower speed value and manually operable means controlling said adjusting means for simultaneously varying the governor settings.

2. In a drive system, a pump, a motor, fluid operable means for varying the displacement of the motor, conduit means connecting the pump outlet with the motor inlet so that the pump delivers fluid under pressure to drive the motor, control valve means for selectively porting fluid to said fluid operable means for varying the displacement of the motor, manually operable means for normally positioning said control valve means including normally rigid resilient means adapted to yield under a predetermined force, an engine for driving the pump including an engine throttle for controlling engine speed, a rotary engine governor responsive to engine speed for controlling the engine throttle to maintain a predetermined engine speed, and a second rotary governor responsive to engine speed for increasing the displacement of the motor upon a drop in engine speed to value below said predetermined value including a governor valve connected to port fluid to and position said control valve means to increase motor displacement, said governor valve being adapted to override said manually operable means when the engine speed drops to said value below said predetermined value.

3. In a hydrostatic transmission, a pump, a motor, means for varying the displacement of the motor, conduit means connecting the pump outlet with the motor inlet and the motor outlet with the pump inlet so that the pump delivers fluid under pressure to drive the motor and the motor returns fluid to the pump, manually operable means connected to the displacement varying means for selecting any desired motor displacement, an engine for driving the pump including an engine throttle for controlling engine speed, a rotary engine governor responsive to engine speed and controlling the engine throttle to maintain engine speed at a predetermined value, and means for overriding the manually operable means for controlling motor displacement including a rotary transmission governor responsive to engine speed and operable to increase the displacement of the motor upon a drop in engine speed to a value below the set predetermined value.

References Cited by the Examiner

UNITED STATES PATENTS

| | | | |
|---|---|---|---|
| 2,500,580 | 3/1950 | Segsworth | 60—19 |
| 2,694,288 | 11/1954 | Nubling | 60—19 |
| 3,003,309 | 10/1961 | Bowers | 60—19 |
| 3,167,907 | 2/1965 | Kempson | 60—19 |

EDGAR W. GEOGHEGAN, *Primary Examiner.*